United States Patent
Mendonsa et al.

(10) Patent No.: US 9,792,939 B2
(45) Date of Patent: Oct. 17, 2017

(54) SERVO TRACKING USING A SINGLE SERVO WRITING PASS PER TRACK FOR MULTI SENSORS

(71) Applicant: Seagate Technology LLC, Cupertino, CA (US)

(72) Inventors: Riyan Mendonsa, Minneapolis, MN (US); Puskal Prasad Pokharel, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 360 days.

(21) Appl. No.: 14/276,504

(22) Filed: May 13, 2014

(65) Prior Publication Data
US 2015/0332719 A1 Nov. 19, 2015

(51) Int. Cl.
| | | |
|---|---|---|
| *G11B 5/56* | (2006.01) | |
| *G11B 5/596* | (2006.01) | |
| *G11B 5/09* | (2006.01) | |
| *G11B 5/55* | (2006.01) | |
| *G11B 11/105* | (2006.01) | |
| *G11B 17/04* | (2006.01) | |

(52) U.S. Cl.
CPC ............ *G11B 5/59655* (2013.01); *G11B 5/09* (2013.01); *G11B 5/5543* (2013.01); *G11B 5/59627* (2013.01); *G11B 5/5526* (2013.01); *G11B 11/10578* (2013.01); *G11B 17/0402* (2013.01)

(58) Field of Classification Search
CPC ... G11B 5/5526; G11B 5/5539; G11B 5/5543; G11B 5/5552; G11B 5/56; G11B 5/58; G11B 5/59688; G11B 11/10578; G11B 17/0402; G11B 2020/1282; G11B 5/59655; G11B 5/59627
USPC ...... 360/55, 75, 63, 76, 77.01, 77.05, 77.08, 360/78.14
See application file for complete search history.

(56) References Cited

U.S. PATENT DOCUMENTS

| | | | | |
|---|---|---|---|---|
| 5,729,408 | A * | 3/1998 | Kikitsu ................ | G11B 5/5526 360/246.1 |
| 5,796,543 | A * | 8/1998 | Ton-That ............. | G11B 5/3967 360/48 |
| 6,052,250 | A * | 4/2000 | Golowka ............. | G11B 5/5526 360/77.08 |
| 6,122,134 | A * | 9/2000 | Kaaden .................. | G11B 21/10 360/48 |
| 7,466,510 | B2 * | 12/2008 | Johnson ................ | G11B 5/584 360/77.01 |
| 2005/0099715 | A1 * | 5/2005 | Yip ........................ | G11B 5/584 360/48 |
| 2013/0335843 | A1 * | 12/2013 | Santoso ................. | G11B 27/36 360/31 |

* cited by examiner

*Primary Examiner* — Thomas Alunkal
(74) *Attorney, Agent, or Firm* — Hollingsworth Davis, LLC

(57) ABSTRACT

At least a portion of a first servo mark is read using a first read head during a rotation of a disk, the rotation comprising no more than 360 degrees. At least a portion of a second servo mark is read using a second read head during the rotation of the disk. Tracking positions of the first read head and the second read head are determined during the rotation based on reading the first servo mark and the second servo mark.

18 Claims, 8 Drawing Sheets

SERVO TRACKING USING A SINGLE SERVO WRITING PASS PER TRACK FOR MULTI SENSORS

SUMMARY

Some embodiments involve a method of reading at least a portion of a first servo mark using a first read head during a rotation of a disk, the rotation comprising no more than 360 degrees. At least a portion of a second servo mark is read using a second read head during the rotation of the disk. Tracking positions of the first read head and the second read head are determined based on reading the first servo mark and the second servo mark. According to various implementations, at least a portion of the first servo mark is read using the second read head.

Some embodiments involve an apparatus that comprises a first reader configured to read at least a portion of a first servo mark during a first single rotation of a disk. A second reader is configured to read at least a portion of a second servo mark during the first single rotation of the disk. A controller is configured to determine tracking positions of the first reader and the second reader during the first single rotation based on reading the first servo mark and the second servo mark.

Various implementations involve an apparatus, comprising a first reader configured to read at least a portion of a first servo during a single rotation of a disk. A second reader is configured to read at least a portion of a second servo during the single rotation of the disk. A controller is configured to determine tracking positions of the first and second readers during the single rotation based on reading the first and second servos and to determine a cross-track displacement between the first and second readers based on the first and second servos.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is generally related to arrangement of servo wedges (also referred to as servo sectors) on a recordable medium (e.g., magnetic disk) of a hard drive. The servo wedges to enable a servo control system to determine precisely where on the recordable medium a read/write head is located. The servo wedges may be pre-formatted on the recordable medium during manufacturing. The servo wedges are generally interspersed on the hard drive between data sectors. The data sectors are partitions within a track used to store user data on the hard drive.

The process of writing servo is a time consuming process using multi disk writers (MDW's) or a boot strapping in situ process. For every servo track, an MDW may make two passes to create a servo pattern for a single reader. This may require the MDW and the heads used in the MDW to have double the TPI capability of a drive as it stitches twice per track. Servo also occupies space on the disk, taking away space that could otherwise be used to store user data.

Multiple read transducers disposed on the same physical plane in close proximity (such as on adjacent read tracks) offer the potential for increased read data rates and processing. This is sometimes referred to as two-dimensional magnetic recording (TDMR). TDMR employs multiple-dimension encoding of data that is subsequently decoded for processing multiple data tracks. In addition to increasing areal density, TDMR may provide increased read-back data rate with a reduced channel buffer if data from the multiple data tracks are read concurrently.

By utilizing the multiple reader architecture for two-dimensional magnetic recording (TDMR), servo can be written half as often, e.g., once every track instead of every half-track. This may allow for increased throughput when writing servo and an improvement in format efficiency. A comparison of the burst signal information between the readers can be used to give a position with the accuracy close to that of servo written every half-track with single reader.

According to various embodiments described herein, a first servo mark of a first track is read using a first read head during a rotation of a disk. In some cases, the rotation comprises no more than 360 degrees. A second servo mark of a second track is read using a second read head during the rotation of the disk. Tracking positions of both the first and second tracks are determined during the rotation based on reading the first and second servo marks.

Figure 1:
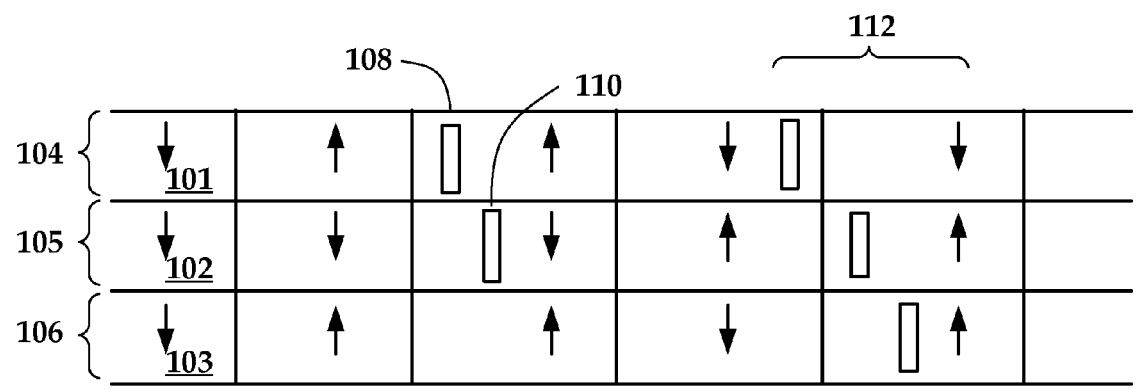
FIG. 1 is a block diagram that illustrates an example of reading two-dimensional tracks according to some implementations.

In reference now to FIG. 1, a block diagram illustrates an example of reading two-dimensional tracks according to an example embodiment. The blocks (e.g., blocks 101-103) represent bits written in respective tracks 104-106 on a magnetic media surface 100. Although the blocks 101-103 are shown aligned to each other from track-to-track, this is not required. The arrows within the blocks represent magnetic orientations that will be sensed as ones or zeros by a reader, e.g., by read transducers 108 and/or 110. More than two read transducers may be used, as indicated by transducer array 112.

The read transducers 108, 110 may include magnetoresistive transducers, such as giant magnetoresistance (GMR) sensor, tunneling magnetoresistance (TMR) sensor, etc. Generally, these types of transducers include layers of magnetic and non-magnetic materials that change resistance in response to local magnetic fields. A current is passed through the sensor while the media moves underneath. The resulting signal is used to read bits on the tracks 104, 105.

Figure 2:
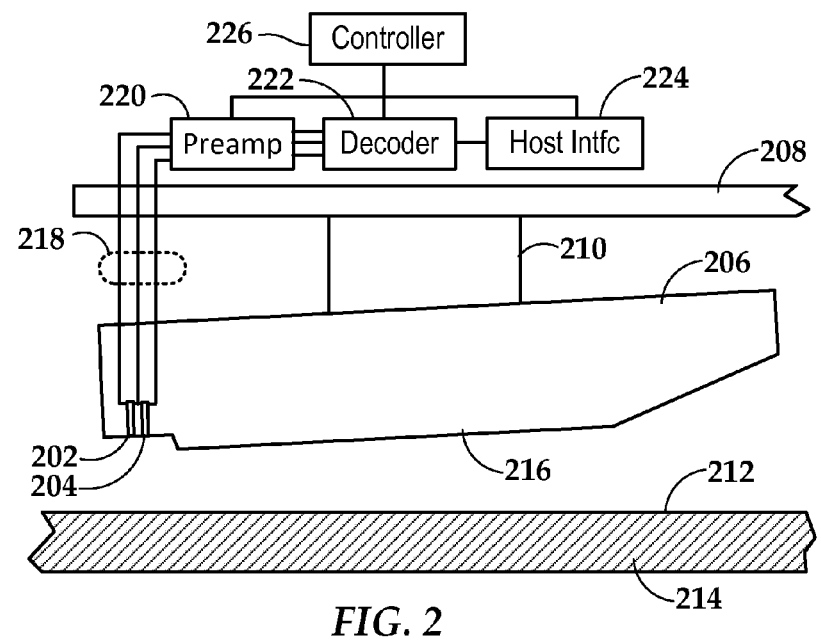
FIG. 2 illustrates a hard disk data storage device according to embodiments described herein.

The read transducers and media shown in FIG. 1 may be part of a hard disk data storage device. Details of such a device according to an example embodiment are shown in FIG. 2. Generally, read transducers 202, 204 are housed at a trailing edge of a slider 206, also sometimes referred to as a read/write head and/or readers. The slider 206 is coupled to arm 208 by way of a suspension 210 that allows some relative motion between the slider 206 and arm 208. In addition to the read transducers 202, 204, the slider 206 may include one or more write transducers (not shown), such as a write pole and coil. When the slider 206 is located over surface 212 of a magnetic disk 214, a flying height is maintained between the slider 206 and surface 212 by a downward force of arm 208. This downward force is counterbalanced by an air cushion that exists between the surface 212 and an air bearing surface 216 of the slider 206 when the disk 214 is rotating.

Changes in local magnetic field caused by the moving disk 214 induce a change in resistance of the read transducers 202, 204. The read transducers are coupled to a preamplifier 220 by way of signal lines 218. Generally, the preamplifier 220 amplifies and conditions the analog signals (which may include a two-dimensional signal) received via signal lines 218, the amplified signals being used for other processing modules such as decoder 222. The decoder 222 determines a digital output from the analog signals, the digital output being used by a host via host interface 224, as well as other system components (not shown). The processing of the signals and data is generally managed by a controller 226, which may include a microprocessor and other logic circuits.

Figure 3:
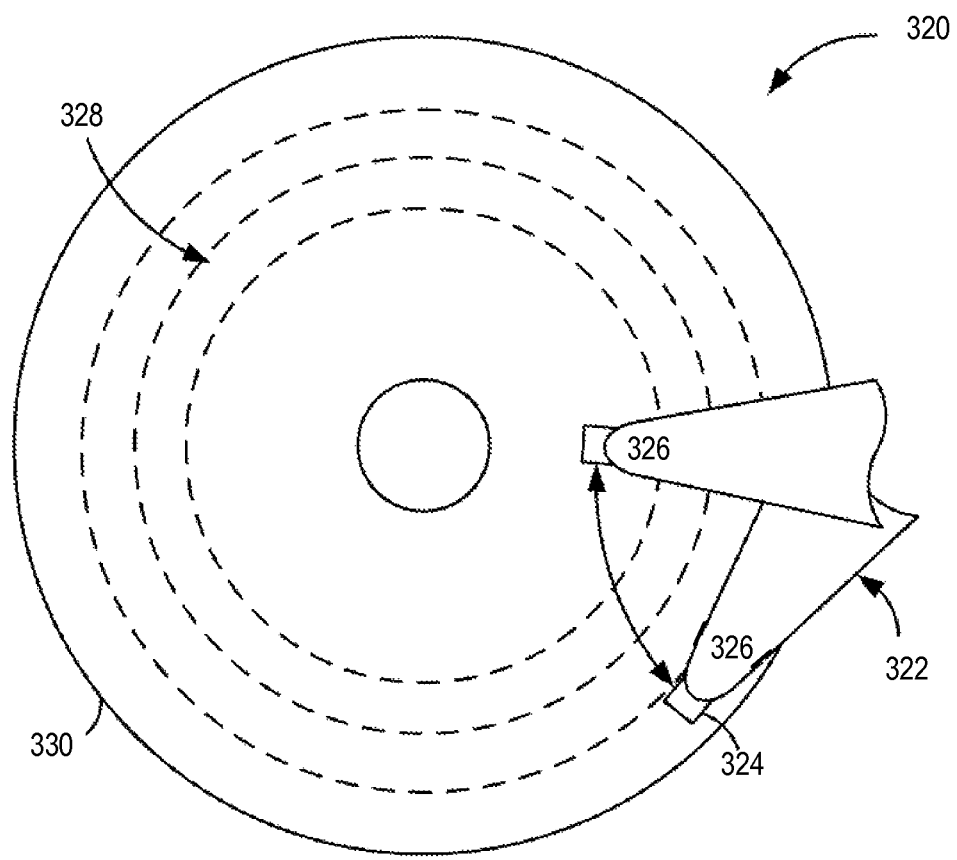
FIG. 3 displays a top view block representation of a data transducing assembly capable of being used in the data storage device of FIG. 2.

FIG. 3 displays a top view block representation of a data transducing assembly 320 capable of being used in the data storage device of FIG. 2. An actuating portion 322 of the data transducing assembly 320 has at least a slider 324 and load beam 326 that translate to access various data tracks 328 of a data storage media 330. As shown, rotation of the actuating portion 322 modifies the angular orientation of the slider 324 in relation to the data tracks 128 in what can be called the skew angle of the actuating portion 322. The relative positioning, size and rotation angles are for illustrative purposes only and should not be interpreted as limiting. In TDMR, multiple data transducers access adjacent data tracks to obtain data that is processed jointly to increase areal data bit density.

Figure 4:
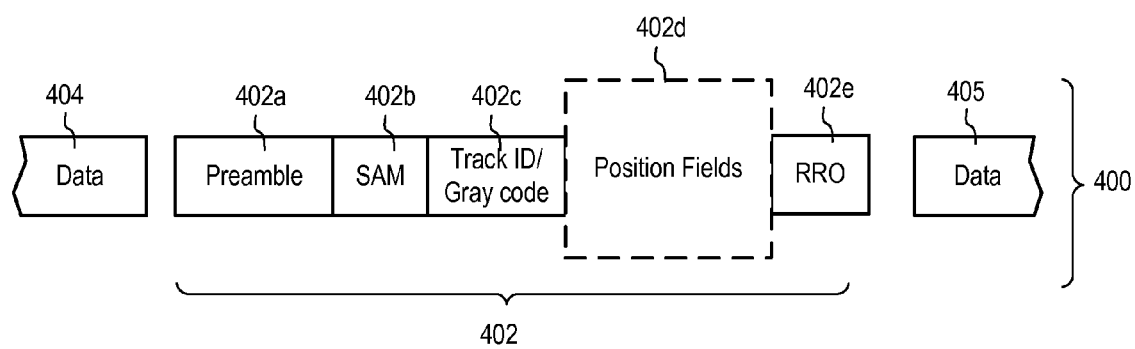
FIG. 4 illustrates an arrangement of data within a servo wedge according to various embodiments.

As describe previously, using TDMR may allow for increased throughput when writing servo and an improvement in format efficiency. In FIG. 4, a block diagram illustrates an arrangement of data within a servo wedge 402 according to various embodiments. The servo wedge 402 is located on a track 400 between a preceding data sector 404 and a following data sector 405. The data sectors 404, 405 store user data, and embodiments described herein may be used with any type and arrangement of data sectors. Generally, servo wedges will be located along a track, separated from each other by data sectors.

The servo wedge 402 includes a preamble 402a, servo address mark (SAM) 402b, servo address 402c (also referred to as track ID), position burst (PS) fields 402d, and one or more repeatable runout (RRO) fields 402e. The preamble 402a is a known magnetic pattern that is read back as a signal. The SAM 402b also includes a known pattern of bits that are read following the preamble 402a. Together, the preamble 402a and SAM 402b allow a read/write channel to positively determine that the beginning of the servo wedge 402 has been detected, and facilitates synchronizing the servo signal to read the subsequent data stored in the servo wedge 402.

In conventional servo wedge arrangements, the address field 402c includes a pattern (e.g., Gray code) that identifies the track in which the servo wedge 402 is located. Position fields 402d may be referred to as servo, burst fields and/or a servo marks. According to various implementations, the position fields 402d are used to determine a fractional position. For example, the position burst fields 402d facilitate fine alignment of the read/write head on the track. The RRO fields 402e also facilitate proper alignment of the read/write heads on a track by correcting for known runout errors.

Generally, each sector will contain an individual identifier (e.g., Track ID/Gray code 402c) that allows the device to determine the current angular position of the drive. While the servo wedge may contain a separate field (not shown) for sector identifier, in this example the servo identifier is included as part of the track identifier 402c. This may be accomplished, e.g., by appending the servo identifier to the track identifier. If there are between 256 and 511 servo wedges per track, for example, this may be accomplished by appending 9 bits to the track identifier.

Figure 5A:
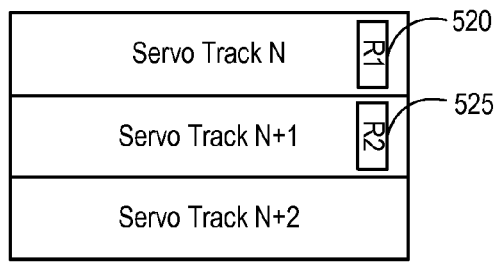
FIGS. 5A-5D illustrate different reader positions according to various embodiments.
Figure 5B:
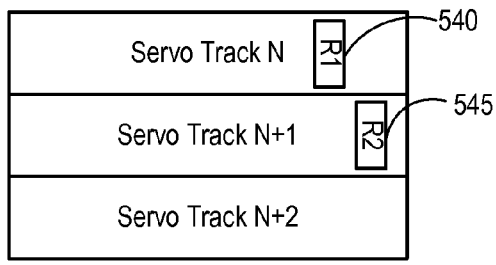
Figure 5C:
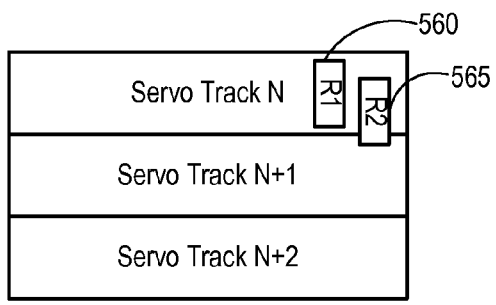
Figure 5D:
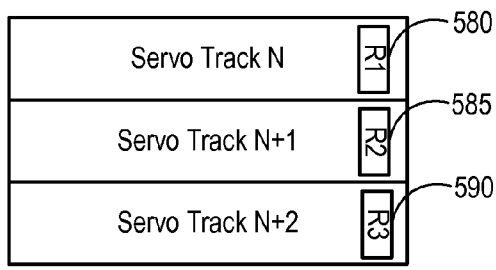

FIGS. 5A-5D illustrate different reader positions in accordance with embodiments described herein. FIG. 5A shows a system having two readers, R1 520 and R2 525. In this example, R1 520 is substantially centered in Servo Track N and R2 525 is substantially centered in Servo Track N+1 as shown. FIG. 5B illustrates an example in which R1 540 is substantially centered in Servo Track N and R2 545 is substantially centered in Servo Track N+1. In this example, R1 540 is displaced from R2 545 in a down-track direction. In some cases, two or more of the readers overlap and are not substantially centered in a track. FIG. 5C shows R1 560 and R2 565 overlapping. R1 560 is substantially centered in Track N and R2 565 overlaps R1 560. In this example, R2 565 is reading mostly Servo Track N and a small portion of Servo Track N+1. In some cases, R2 may overlap R1 and read a small portion of Servo Track N. FIG. 5D shows an example of a system having three readers, R1 580, R2 585, and R3 590. In FIG. 5D each of R1, R2, and R3 are located in respective tracks N, N+1, and N+2. In some cases, there may be varying degrees of overlap between R1, R2, and R3.

Figure 6A:
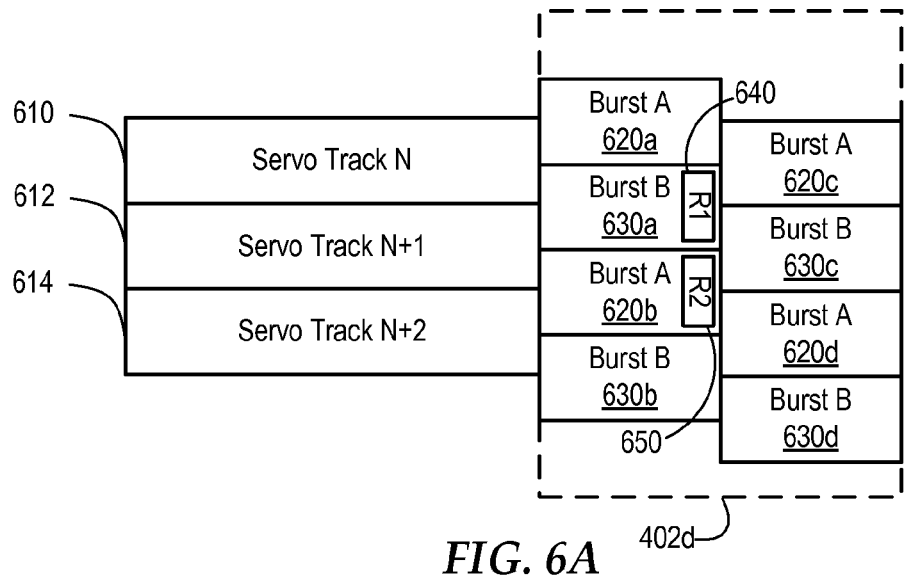
FIG. 6A illustrates embodiments having two separate columns of position fields.

The position fields 402d of FIG. 4 may have different configurations. For example, FIG. 6A illustrates embodiments having two separate columns of position fields 620a, 620b, 620c, 620d, 630a, 630b, 630c, 630d for servo tracks N 610, N+1 612, and N+2 614. According to various embodiments, the first column of servo position are offset from the servo track as shown in FIG. 6A. The second column of position fields 620c, 630c, 620d, 630d may also be offset from the first column of position fields 620a, 630a, 620b, 630b as shown. The half track offset between the two sets of bursts, and two sets of bursts may be used to determine the direction of the offset from center.

According to FIG. 6A, there are two different burst signal frequencies that alternate, Burst A and Burst B. In some cases, there are more than two different burst signal frequencies. Two readers, R1 640 and R2 650 are shown. The signals read from R1 640 and R2 650 can be used to determine a fractional position of the readers R1 640 and R2 650. According to some embodiments, the position of the readers is obtained by determining a cross-track displacement between R1 640 and R2 650 by using the position fields 402d. In some cases, the position of readers R1 640 and R2 650 is done separately using the position fields 402d. According to various embodiments, there are more or less than two readers used to determine a position of the reader (s).

Figure 6B:
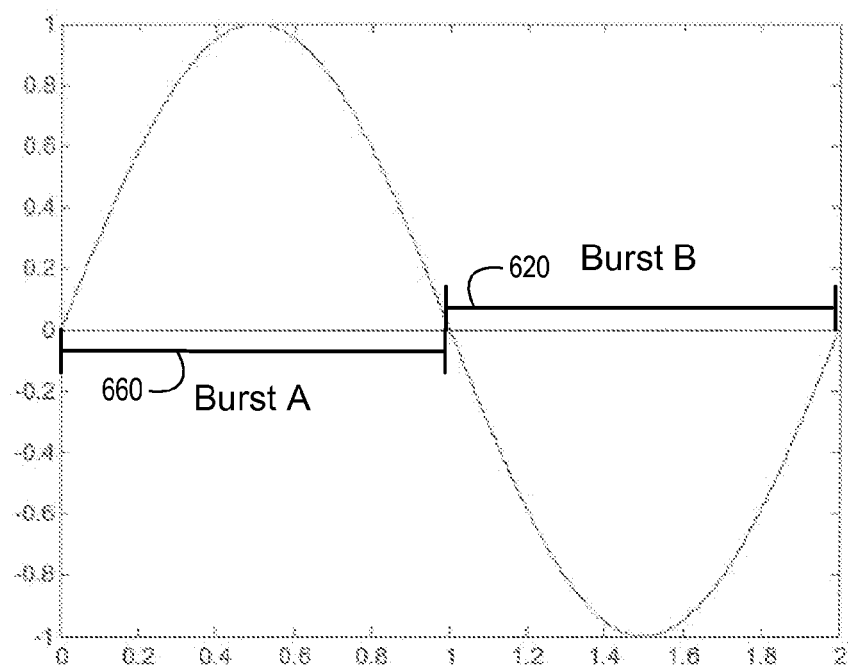
FIG. 6B is the PES signal estimated using the position fields illustrated in FIG. 5, according to some embodiments.

A position error signal (PES) may be obtained from the position fields 402d illustrated in FIG. 6A can be estimated by the curve shown in FIG. 6B using the readers R1 640 and R2 650. The PES can be determined in response to comparing first and second information of the respective first and second position fields. According to various implementations, the positive amplitude signal 660 is obtained from the Burst A signals 620a-d and the negative amplitude signal 670 is obtained from the Burst B signals 630a-d. In FIG. 6B, the y axis is the signal amplitude and 1 is its normalized maximum amplitude. The x-axis in FIG. 6 is the cross-track position, where 0.5 and 1.5 are track centers.

One way to reduce the servo wedge size is to utilize TDMR allowing for writing servo every track instead of every half-track. This can be done by using a single column of position fields 402d and determining a cross-track displacement between two or more readers to determine a fractional position of the readers on the media. One column of position fields may allow for a similar accuracy when used with at least two readers as a two column embodiment used with one reader.

Figure 7A:
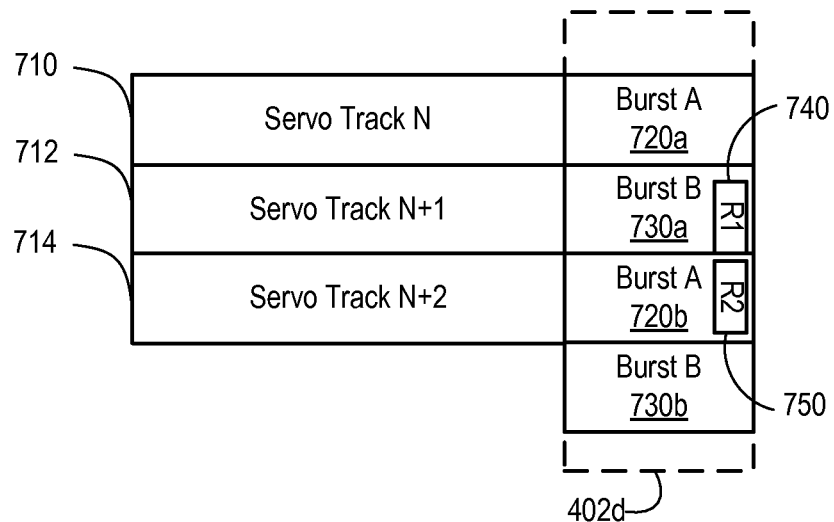
FIGS. 7A and 7B show a servo wedge having a single column of position fields with different positions for the readers.
Figure 7B:
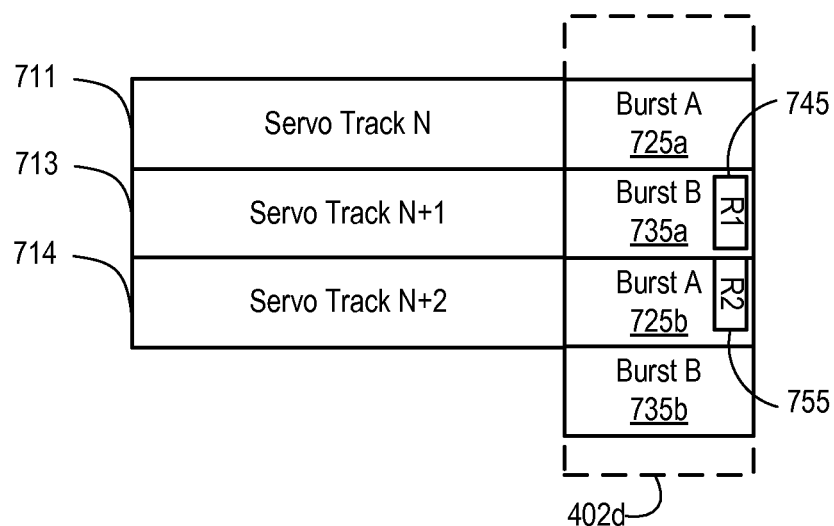

FIGS. 7A and 7B show a servo wedge having a single column of position fields 402d with different positions for the readers R1 740, 745 and R2 750, 755 for servo tracks N 710, 711, N+1 712, 713, and N+2 714, 715. In FIG. 7A, reader R2 750 is centered in Servo Track N+2 714 while Reader R1 is not centered in Servo Track N+1. FIG. 7A shows reader R1 745 centered in Servo Track N+1 713 while reader R2 755 is not centered in Servo Track N+2 714. In some cases, both reader R1 and Reader R2 are centered in respective tracks or neither is centered in a track. 1. In some cases, the preamble of the servo signal is at substantially the same frequency as at least one of the position fields. This can be used to help determine a maximum amplitude of each reader over the position fields. For example, the preamble amplitude can be used as a reference amplitude that is compared with respective amplitudes of one of the A or B burst fields.

In some embodiments, the preamble of the servo signal (e.g., preamble 402a shown in FIG. 4) is not at substantially the same frequency as least one of the position fields. In such a case, a second set of position fields with a constant frequency and phase can be used. According to various implementations the width of the readers is matched to the track width and/or there is one position field per track. The second set of position fields with a fixed frequency may be used to increase accuracy and/or estimate a fly height using the Wallace equation, for example. The fly height may be determined by comparing the amplitudes of the preamble and that of the second set of position fields, for example.

As will be discussed in greater detail below, a dual reader slider can read two burst signals and use a comparison of amplitudes between the signals to estimate PES. The algorithm that performs this may also need to know reader positions relative to each other. These relative positions may generally change as a function of radial location on the disk, e.g., due to skew. These separations may be predetermined, based on design dimensions, drive geometry, maximum tolerances, etc. During servo calibration, a bootstrapping process can be used to further improve the knowledge of reader-to-reader spacing at different radial locations.

Figure 8A:
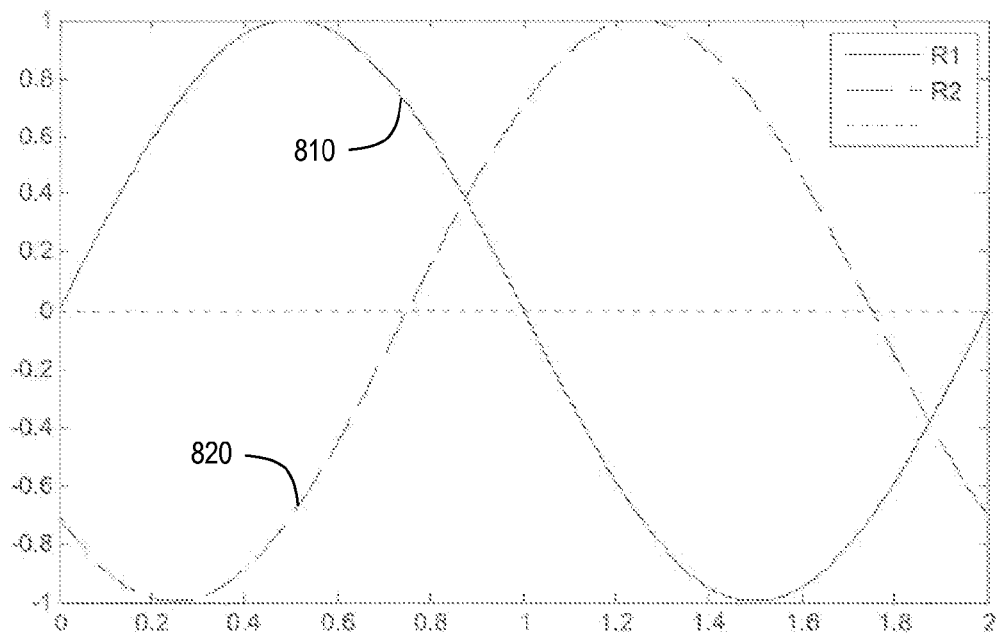
FIG. 8A shows the PES signal obtained from the position fields illustrated in FIG. 7A in accordance with some implementations.

According to various implementations, the PES signal obtained from the position fields 402d illustrated in FIG. 7A can be estimated by the set of curves 810, 820 shown in FIG. 8A. In some cases, the curves 810, 820 shown in FIG. 8A is obtained by at least two readers that are ¾ track apart and/or have the same resolution capability. In some cases, the cross-track displacement between readers R1 and R2 is less than one track. According to various embodiments, the readers may be a track or greater than a track apart. In some cases, the readers have a small offset or overlap one another. According to FIG. 8A, the first curve 810 is obtained from reader R1 740, 745 and the second curve 820 is obtained from reader R2 750, 755. The exemplary signal curves shown in FIG. 8A are unique across two tracks.

Figure 8B:
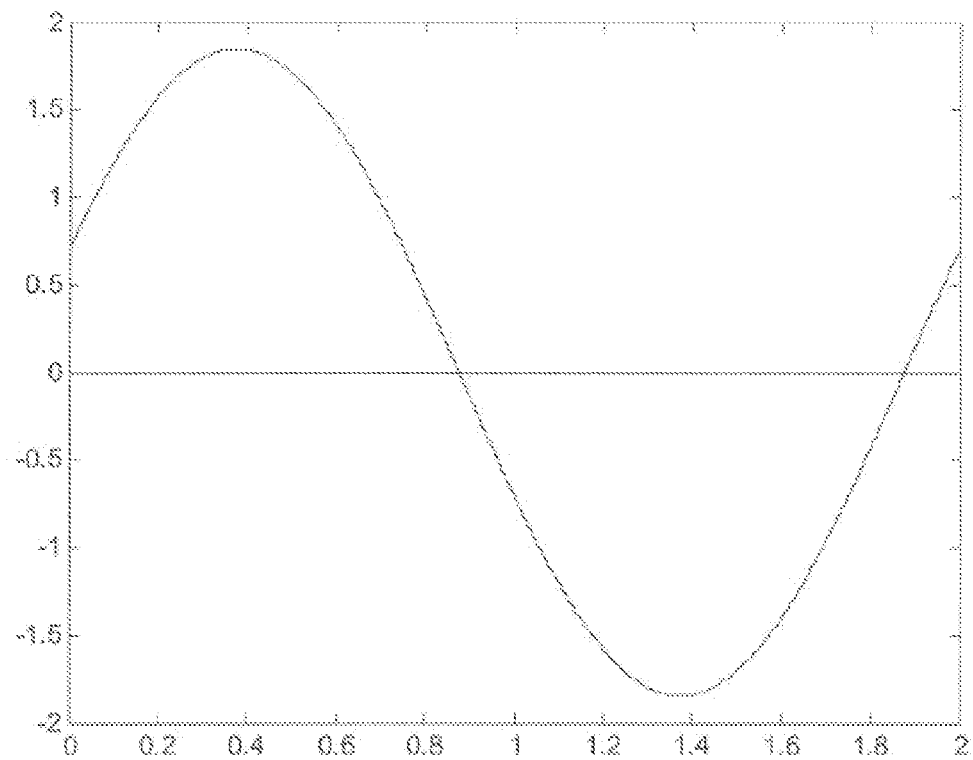
FIG. 8B illustrates a curve obtained from determining the difference between the curves in FIG. 8A.

FIG. 8B illustrates a curve obtained from determining the difference between the curves 810, 820. For example, at cross-track position 0.5, the value of curve 810 in FIG. 8A is at about 1, and curve 820 is about −0.75 due to the ¾ cross-track displacement. Therefore, the value of the curve in FIG. 8B at a cross-track position 0.5 is 1−(−0.75)=1.75. This can be performed by an analog or digital summing circuit. As shown, the curve is cyclic across two tracks and can be used to determine the PES using at least two readers. In order to distinguish between points with similar amplitude differences, the individual signals 810, 820 of the two readers can be compared.

Figure 9:
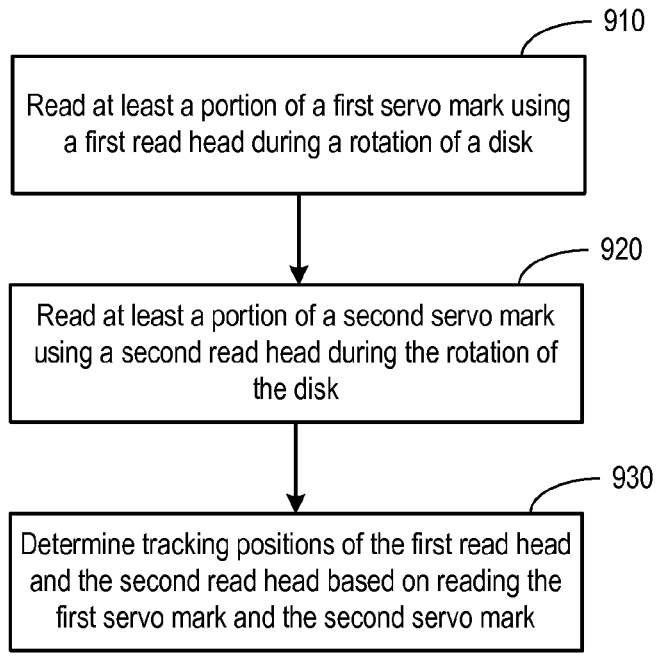
FIG. 9 is a flow diagram that describes determining a tracking position of at least one read head based on first and second servo marks in accordance with embodiments described herein.

FIG. 9 is a flow diagram in accordance with various implementations. At least a portion of a first servo mark is read 910 using a first read head during a rotation of a disk. According to some implementations, the rotation is no more than 360 degrees. At least a portion of a second servo mark is read 920 using a second read head during the rotation of the disk. Tracking positions of the first read head and the second read head are determined 930 based on reading the first servo track and the second servo mark. According to various implementations the second servo mark is phase offset from the first servo mark. In some cases, the second servo mark is at a different frequency than the first servo mark. According to various embodiments at least a portion of a third servo mark is read using one or more of the first read head, the second read head, and/or a third read head.

Figure 10:
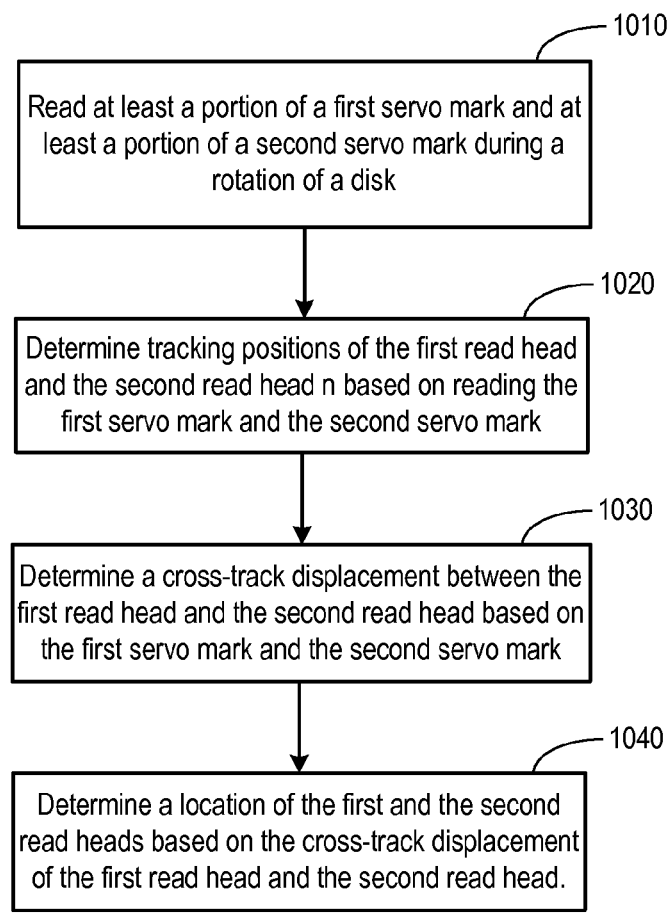
FIG. 10 illustrates a flow diagram describing determining a tracking position of two read heads based on first and second servo marks according to various aspects.

FIG. 10 shows a more detailed flow diagram in accordance with embodiments described herein. At least a portion of first servo mark is read 1010 using a first read head and at least a portion of a second servo mark is read 1010 using a second read head during a rotation of a disk. The first read head and the second read head may be co-located on a slider. Tracking positions of both the first and second tracks are determined 1020 based on reading the first servo mark and the second servo mark. A cross-track displacement between the first read head and the second read head is determined 1030 based on the first servo mark and the second servo mark. A location of the first and the second read heads is determined 1040 based on the cross-track displacement of the first read head and the second read head. In some cases the first read head and the second read head overlap and/or the second read head may read at least a portion of the first servo mark. In some cases a skew of a slider is determined based on reading the first servo mark and the second servo mark during the rotation of the disk and based on the cross-track displacement of the first and second read heads.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to in data storage devices as described above.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

The invention claimed is:

1. A method comprising:
    reading at least a portion of a first servo mark using a first read head during a rotation of a disk, the rotation comprising no more than 360 degrees;
    reading at least a second portion of the first servo mark using a second read head during the rotation of the disk;
    reading at least a portion of a second servo mark using the second read head during the rotation of the disk; and
    determining tracking positions of the first read head and the second read head during the rotation based on reading the first servo mark and the second servo mark.

2. The method of claim 1, wherein the first read head and the second read head are offset from one another in at least a cross-track direction.

3. The method of claim 1, further comprising determining a skew of a slider based on reading the first servo mark and the second servo mark during the rotation of the disk and based on a cross-track displacement of the first and second read heads.

4. The method of claim 1, further comprising determining a cross-track displacement between the first read head and the second read head based on the first servo mark and the second servo mark.

5. The method of claim 4, further comprising determining a location of the first and the second read heads based on the cross-track displacement of the first read head and the second read head.

6. The method of claim 5, wherein the cross-track displacement between the first read head and the second read head is less than one track.

7. The method of claim 1, wherein the first servo mark is phase offset from the second servo mark.

8. The method of claim 1, further comprising reading least a portion of a third servo mark using at least one of the first read head and the second read.

9. The method of claim 1, further comprising determining a position error signal in response to comparing first and second information of the respective first and second servo marks.

10. The method of claim 1, wherein a servo preamble has a same frequency of at least one servo mark of the first and second servo mark, the method further comprising using an amplitude of the servo preamble as a reference to determine an relative amplitude of the at least one servo mark.

11. An apparatus, comprising:
    a first reader configured to read at least a portion of a first servo mark during a first single rotation of a disk;
    a second reader configured to read at least a second portion of the first servo mark and at least a portion of a second servo mark during the first single rotation of the disk; and
    a controller configured to determine tracking positions of the first reader and the second reader during the first single rotation based on reading the first servo mark and the second servo mark.

12. The apparatus of claim 11, wherein the first servo mark is phase offset from the second servo mark.

13. The apparatus of claim 11, wherein the controller is further configured to determine a skew of a slider based on reading the servo mark during the first rotation of the disk and based on a separation of the first reader and the second reader.

14. The apparatus of claim 11, wherein there is one servo mark per track.

15. The apparatus of claim 11, wherein at least one of the first reader and the second reader is configured to read a third servo mark during the first rotation of the disk.

16. An apparatus, comprising:
    a first reader configured to read at least a portion of a first servo during a single rotation of a disk;
    a second reader configured to read at least a second portion of the first servo and at least a portion of a second servo during the single rotation of the disk; and
    a controller configured to determine tracking positions of the first and second readers during the single rotation based on reading the first and second servos and to determine a cross-track displacement between the first and second readers based on the first and second servos.

17. The apparatus of claim 16, wherein the controller is further configured to determine a location of the first and second readers based on the cross-track displacement between the first and second readers.

18. The apparatus of claim 16, wherein the cross-track displacement between the first and second readers is less than one track.

* * * * *